July 7, 1964 H. G. FEISSEL 3,140,401
TRANSISTOR SWITCHING DEVICE
Filed July 20, 1960

Inventor:
Henri Gerard Feissel;
By his attorneys,
Baldwin + Wight

United States Patent Office 3,140,401

Patented July 7, 1964

3,140,401
TRANSISTOR SWITCHING DEVICE

Henri Gerard Feissel, Paris, France, assignor to Compagnie des Machines Bull (Société Anonyme), Paris, France Filed July 20, 1960, Ser. No. 44,203
Claims priority, application France July 24, 1959
3 Claims. (Cl. 307—88)

The present invention relates to transistor switching devices and is concerned more particularly with transistor switching devices for use in computers and data processing apparatus.

A switching device according to the invention is particularly well adapted to select one or more energizing circuits in a matrix storage system comprising magnetic cores.

Such a switching device must be capable of controlling a relatively large current. Moreover, its response time must be reduced to a minimum and it must not set up any parasitic signals. Finally, it is desirable that its construction and its operation should be as simple as possible.

The device according to the invention employs the process at present known for the presaturation of a transistor, but has a number of novel features which enable it to meet the above-defined requirements.

One of the said features is that the load impedance, consisting of a series of windings of a storage column, is inserted between the emitter of the switching transistor and a terminal supplying a reference voltage. The current which is or is not to be transmitted to the said windings is supplied by a current pulse generator, which is connected to the collector of the said transistor. Thus, the impedance matching is readily effected.

Another feature is that the emitter-base space of the transistor, which must be presaturated, is acted on by the secondary winding of a pulse transformer. During the transmission of the power pulse by the saturated transistor, the counter-electromotive force which is set up across the terminals of the series windings is variable and depends upon the state of magnetization of the cores of the selected column. Since the said secondary winding is connected only to the emitter and to the base of the transistor, the momentary potentials of the said electrodes may fluctuate in accordance with the amplitude of the said counter-electromotive force without the operation of the switch thus being disturbed.

Another feature is that the selective presaturation of the switching transistor is effected in a simple and economical manner by virtue of the association of a diode switching circuit with two primary windings of the input transformer of the device.

Accordingly, the invention provides a transistor switching device for selectively controlling the read-out of data stored in a series of highly remanent magnetic cores, characterized in that a series of exciting windings for the cores are connected as a load impedance between the emitter electrode of the switch transistor and a constant voltage source, and that a pulse for selective control of the transistor conduction can be applied to input circuit elements adapted to follow the voltage variations of the emitter electrode.

Figure 1:
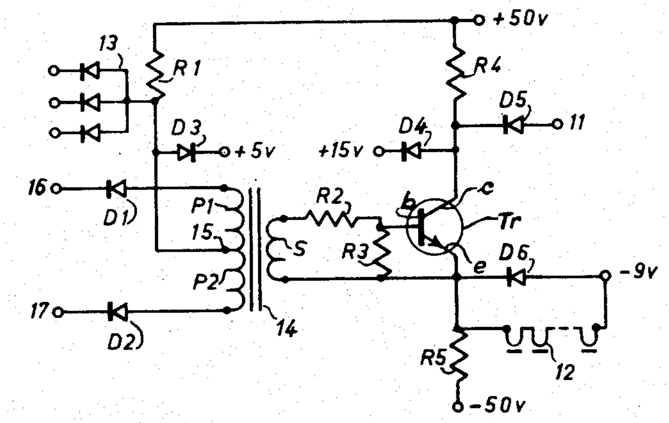
Figure 2:
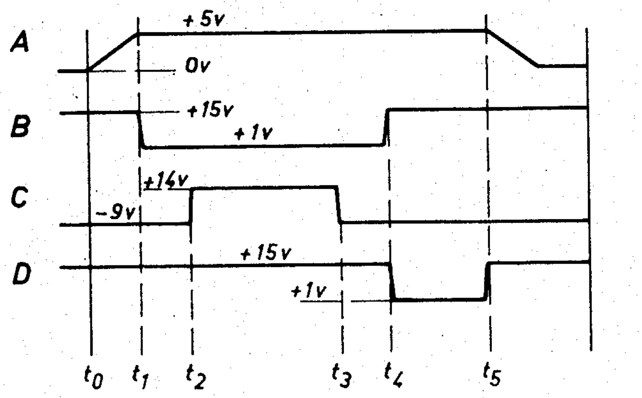

For a better understanding of the invention and the method by which it is to be performed, an embodiment thereof will now be described, by way of example, with reference to the accompanying drawings, in which:

FIGURE 1 is an electrical circuit diagram of a device according to the invention, and FIGURE 2 is a time graph of the pulses applied to the device.

In FIGURE 1, a transistor *Tr* is shown as being of the type having NPN conductivity. The collector *c* of the transistor is connected to the terminal 11 through a diode D5. The emitter *e* is connected to a terminal of a voltage source (−9 volts), on the one hand through a diode D6 and on the other hand through a series of windings 12, which constitute the energizing winding of a column of a static magnetic storage device. The said column may be, for example, composed of about twenty toroidal magnetic cores.

The switch device has the object of controlling the reading of the data stored in an associated matrix column. For this purpose, a reading pulse generator (not shown) is connected to the terminal 11. It supplies at each reading cycle a pulse which is transmitted to the windings of the column in question only if the transistor has previously been saturated, that is to say rendered conductive.

One end of the secondary winding S of a transformer 14 is directly connected to the emitter *e*. The other end is connected to the base *b* through a resistance R2. The value of the said resistance is relatively low, but sufficient to minimize the effects of the variations of the base spreading resistance in the saturated state (R*bb'*).

The transformer 14 comprises two primary windings P1 and P2. Their junction point 15 is connected to the output of an "and" circuit 13, which is composed of three diodes and a resistance R1. The "and" circuit 13 performs the function of selectively controlling the switch. For this purpose, its three inputs must simultaneously receive the coded signals which represent the location address of the corresponding storage column. The members supplying these signals do not form part of the invention and have therefore not been illustrated. A pulse generator (not shown) is connected to terminal 16 to supply to the device at each cycle a saturation pulse (wave form B, FIGURE 2). Another pulse generator (not shown) is connected to terminal 17 to supply to the device at each cycle a desaturation pulse (wave form D, FIGURE 2).

FIGURE 1 indicates the values of the voltages which can be supplied by direct-voltage sources. By way of example, a set of possible values for the resistances is as follows:

R1=3.8 kilohms
R2=68 ohms
R3=1 kilohm
R4=12 kilohms
R5=18 kilohms

All the diodes are germanium crystal rectifier elements. FIGURE 2 indicates the voltage levels of the pulses applied to the device in the course of a reading cycle. An interval such as that between *t*1 and *t*2 corresponds to approximately 1 microsecond.

In the absence of any pulse, the control members of the "and" circuit 13 are so adapted that the potential of the three inputs is 0 volt. The potential across the terminals 16 and 17 is +15 volts, so that the diodes D1 and D2 are blocked. The potential of the terminal 11 is −9 volts. The diode D5 is blocked and the potential of the collector is slightly higher than +15 volts by reason of the current flowing in R4 and D4. The potential of the emitter is substantially equal to −9 volts. In practice, no current flows through the transistor, which is equivalent to an open switch. The diode D3 is blocked, and the current flowing through R1 is distributed in the diodes of the circuit 13.

It will be assumed that in the course of a reading cycle the switch must be closed in order to feed the reading selection winding of the associated storage column. At the beginning of the cycle, the signals applied to the inputs of the circuit 13 are such that the three diodes are blocked and the output voltage, i.e. the voltage of the point 15, follows the wave form A, FIGURE 2. From the instant *t1*, the current flowing in R1 is branched through the diode D3, which has become conductive. At the same instant, the saturation pulse applied to the terminal 16 brings the free end of the first primary winding P1 to +1 volt. The current then flowing in the said primary winding sets up a positive pulse at the terminals of the secondary winding, so that a relatively large current flows through R2 and progressively saturates the base-emitter space of T*r*, between the instants *t1* and *t2*. A certain collector current is set up during this time through R4, the diode D4 becoming non-conductive. The emitter current flows partly through the windings 12, but it is too weak to cause any undesirable disturbance.

At the instant *t2*, the power pulse (wave form C, FIGURE 2) is applied to the terminal 11. The impedance presented by the transistor in the saturated state being very low, the series of windings 12 receives an energizing current of about 150 milliamperes. According to the number of magnetic cores which are in the state 1, a counter-electromotive force of variable amplitude is set up across the terminals of the said windings at the beginning of the period *t2–t3*, but nothing prevents the emitter, and consequently the base, from following this momentary potential variation. The power pulse lasts until the instant *t3*, which is sufficient to give the magnetic cores in the state 1 time to change over to the opposite state of magnetization.

The transistor is still saturated during the period *t3–t4*. At the instant *t4*, the pulse applied to the terminal 16 ceases, and the de-saturation pulse applied to the terminal 17 produces a flow of current through the second primary winding P2. The pulse of negative direction which is thus set up at the secondary winding has the effect of driving off the charges accumulated in the base-emitter space of the transistor, whereby the latter is de-saturated. At the end of the de-saturated pulse, that is to say, at the instant *t5*, the resistance of the emitter-base space again becomes very high. The function of the resistance R3 is to damp the circuit including the secondary winding S in order that the return to zero voltage may take place exponentially and not by damped oscillations. During the downward slope of the pulse A, the device returns to the inoperative state.

Should the switch have to remain open, at least one of the diodes of the "and" circuit 13 remains conductive. Throughout the duration of the reading cycle, the voltage of the junction point 15 of the transformer remains at 0 volt. At the instants *t1* and *t4*, the saturation and de-saturation pulses have no effect on the transformer, since the diodes D1 and D2 retain an inverse bias of about 1 volt. At the instant *t2*, the power pulse finds the transistor non-conductive, which is equivalent to an open switch. This effect is further strengthened by the presence of the diode D5, of which the equivalent capacitance is extremely low. Thus, the voltage variations set up at the terminal 11 cannot charge the transition capacitances of the transistor, and no parasitic signal can thus be transmitted to the charge.

The particularly simple association of the "and" circuit

13 with the two primary windings of the transformer will be noted. Two systematic control signals are thus applied, which have no effect as long as the selective control signal is absent.

Naturally, modifications could be made by the person skilled in the art to the described embodiment without departing from the scope of the present invention. This includes the adaptation of the device for the purpose of utilizing a transistor of the PNP type.

I claim:

1. Transistor switching device for selectively controlling the read-out of data stored in a series of highly remanent magnetic cores, comprising a transistor with emitter, base and collector electrodes, voltage source means with two terminals, a set of series-connected magnetization windings for said cores connected as a load impedance between the emitter electrode of said transistor and a terminal of said source means, an input transformer including a secondary winding with two extremities, one extremity being coupled to the base electrode of said transistor and the other extremity being connected to said emitter electrode, a first primary winding and a second primary winding with a junction point common to both primary windings, and an "AND" logical circuit, the output terminal of which is connected to said junction point, whereby a control pulse applied to said first primary winding is transmitted to saturate the base electrode of said transistor in dependence on the state of said logical circuit.

2. Switching device according to claim 1, wherein said second primary winding is adapted to receive later in the same read-out cycle time one control pulse for transmission to cause de-saturation of said transistor.

3. Transistor switching device for selectively controlling the read-out of binary data stored in a set of bistable magnetic cores, with terminals for receiving direct current voltages and power pulses to be applied to the collector electrode of a switching transistor, said device comprising in combination: a transistor with emitter, base and collector electrodes, a winding composed of series connected magnetization coils for said cores connecting the emitter electrode of said transistor to one of said terminals, an input transformer which includes two primary windings with a common junction and a secondary winding with two extremities, one of said extremities being coupled to the base electrode of said transistor, the other extremity being directly connected to the emitter electrode of said transistor, two terminals connected to said primary windings for respectively applying control pulses to said primary windings, and an "AND" logical circuit with an output terminal connected to said common junction of said primary windings for controlling the transmission of said control pulses by said transformer.

References Cited in the file of this patent

UNITED STATES PATENTS

| | | |
|---|---|---|
| 2,910,594 | Bauer et al. | Oct. 27, 1959 |
| 2,922,988 | Rosenthal | Jan. 26, 1960 |
| 2,956,174 | Tulp | Oct. 11, 1960 |
| 2,962,602 | Decker et al. | Nov. 29, 1960 |
| 2,966,661 | Haynes | Dec. 27, 1960 |